United States Patent
Rall et al.

[11] Patent Number: 5,617,282
[45] Date of Patent: Apr. 1, 1997

[54] DATA COMMUNICATION SYSTEM

[75] Inventors: Bernhard Rall, Ulm; Jürgen Dorner, Wendlingen, both of Germany

[73] Assignee: Daimler-Benz AG, Stuttgart, Germany

[21] Appl. No.: 202,250

[22] Filed: Feb. 25, 1994

[30] Foreign Application Priority Data

Mar. 2, 1993 [DE] Germany ............ 43 06 361.6

[51] Int. Cl.$^6$ ............................................. H02H 9/00
[52] U.S. Cl. ..................... 361/56; 361/58; 361/18
[58] Field of Search ....................... 361/18, 56, 58, 361/111, 119; 323/273, 274, 276, 289; 363/78, 73; 340/825.25, 825.16; 370/85.1, 85.2, 85.6, 85.13

[56] References Cited

U.S. PATENT DOCUMENTS

| | | | |
|---|---|---|---|
| 3,983,471 | 9/1976 | Itoh et al. | 361/18 |
| 3,983,473 | 9/1976 | Sanderson | 323/274 |
| 4,758,920 | 7/1988 | McCartney | 361/119 |
| 4,942,571 | 7/1990 | Möller et al. | 307/10.1 |
| 5,130,636 | 7/1992 | Kumar et al. | 361/98 |

FOREIGN PATENT DOCUMENTS

| | | |
|---|---|---|
| 3826774 | 2/1990 | Germany . |
| 3931537 | 4/1991 | Germany . |
| 4235616 | 4/1993 | Germany . |
| 90/009713 | 8/1990 | WIPO . |

OTHER PUBLICATIONS

Philips Components Unternehmensbereich der Philips GmbH, "CAN Specification Version 1.2" (Sep. 1990), pp. 1–30.

International Organization for Standardization, "Road vehicles—Interchange of digital information—Controller Area Network (CAN) for high speed communication," (ISO/TC 22/SC3 N 608), (Jan. 1991) pp. 1–17, 49, 59, 60.

*Primary Examiner*—Jeffrey A. Gaffin
*Assistant Examiner*—Ronald W. Leja
*Attorney, Agent, or Firm*—Spencer & Frank

[57] ABSTRACT

A data communication system, particularly for motor vehicles, includes a bus system with transmission lines which connect terminal devices to a common node. A protective circuit is connected between the transmission lines and a reference potential such as ground. If the ground connection of one of the terminal devices becomes detached, this protective circuit allows communication among the remaining terminal devices. The protective circuit is simultaneously secured against destruction in case of a short circuit.

18 Claims, 2 Drawing Sheets

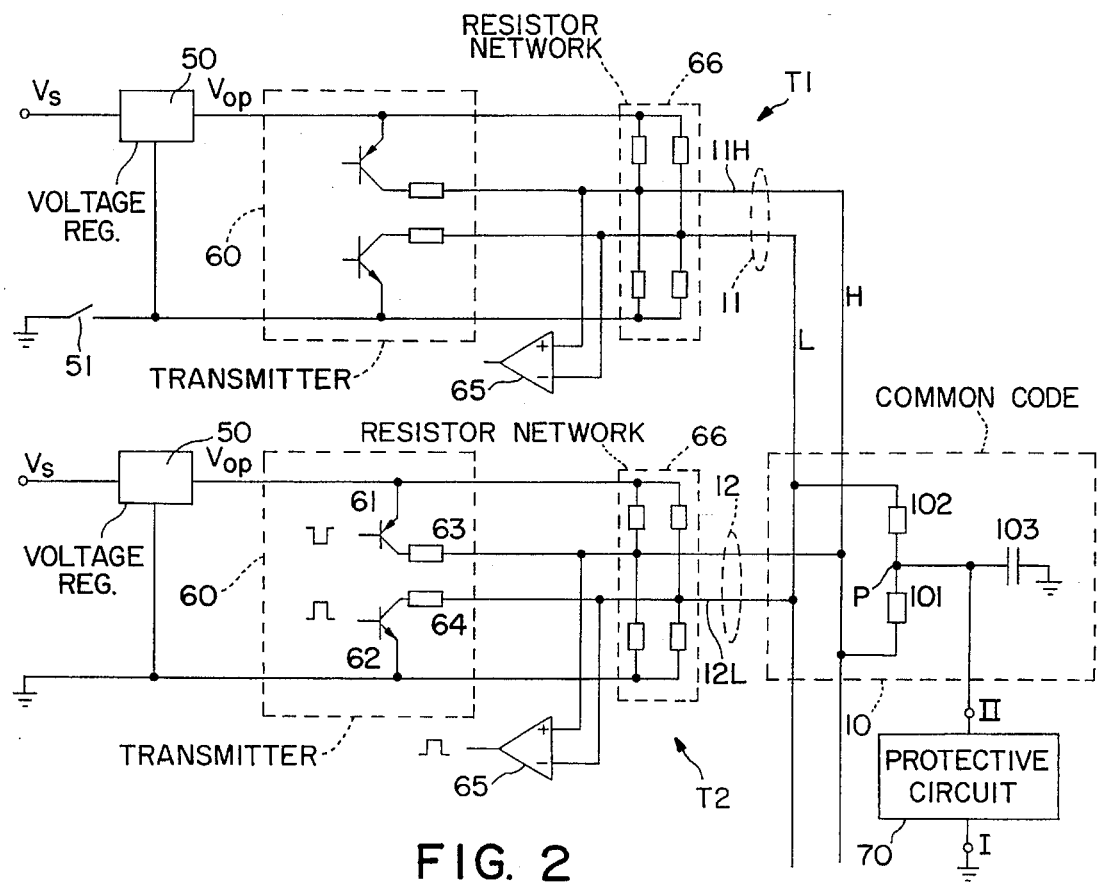
FIG. 2
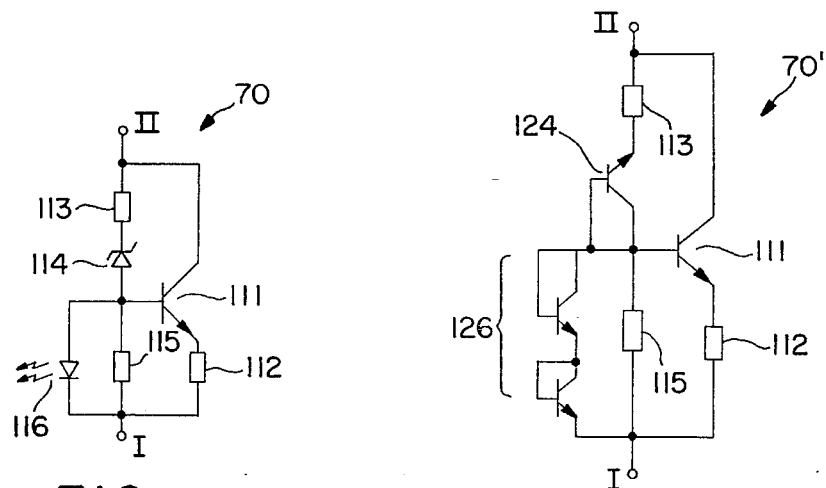
FIG. 4
FIG. 5

5,617,282

DATA COMMUNICATION SYSTEM

CROSS REFERENCE TO RELATED APPLICATION

This application claims the priority of German Application Serial Number P 43 06 361.6, filed Mar. 2, 1993, which is incorporated herein by reference.

BACKGROUND OF THE INVENTION

The invention relates to a data communication system, particularly for a motor vehicle.

The CAN BUS system is an example of a data communication system which is used in motor vehicles for monitoring, connecting, and controlling a plurality of functions. Various control or operational devices are associated with terminal devices which are connected to the bus system, and each contains its own voltage control device for generating an operating voltage from the higher battery voltage of the vehicle's electrical system. During regular operation, the voltages on the data transmission lines of the bus system lie within an operating voltage range; an average constant voltage level is set by way of resistor networks at approximately one half of the operating voltage. The entire data communication process may be interrupted due to short circuiting of a data transmission line to ground potential or to the battery potential, or due to separation of the ground connection of a terminal device.

Separation of the ground connection at only one terminal device can lead to the disruption of the entire data communication process due to a shift of the constant voltage level on the data transmission lines, although the entire communication system would still operate adequately without this one terminal device.

SUMMARY OF THE INVENTION

Thus, it is the object of the invention to provide a data communication system that permits data communication, without impairing the reliability of the system against a short circuit with a power supply potential, even if the ground connection of a terminal device is separated.

A data communication system in accordance with the present invention includes a data transmission line and a protective circuit which is connected between the transmission line and a reference potential, the protective circuit having a current-voltage characteristic with regions (a), (b), and (c), wherein:

- in region (a), which lies below a threshold voltage that is itself above the normal voltage of the transmission line, no discharge current flows through the protective circuit between the transmission line and the reference potential;
- in region (b), which lies between the threshold voltage and a knee voltage, the discharge current through the protective circuit rises sharply as the voltage between the transmission line and the reference potential increases; and
- in region (c), which lies above the knee voltage, the discharge current through the protective circuit is limited.

Even if the ground connection of one terminal device is separated, the invention permits data communication between the other terminal devices since the potential of the transmission lines is limited to a value which can still be processed in the terminal devices. In case a short circuit between a transmission line and the supply potential occurs, the current is limited by the protective circuit such that the latter is not destroyed. However, data communication is generally no longer possible in case of such a short circuit. The invention is particularly advantageous in a symmetrical or balanced system, especially in the CAN BUS system, due to the arrangement of the protective circuit at a neutral point for data signals during normal operation.

BRIEF DESCRIPTION OF THE DRAWINGS

FIG. 2 illustrates a portion of a data communication system in accordance with the present invention, and shows two terminal devices and transmission lines which are connected at a common node where a protective circuit is also provided, one of the terminal devices having a broken ground connection;

FIG. 4 is a schematic diagram illustrating a first embodiment of the protective circuit;

FIG. 5 is a schematic diagram illustrating a further embodiment of the protective circuit.

DESCRIPTION OF THE PREFERRED EMBODIMENTS

Figure 1:
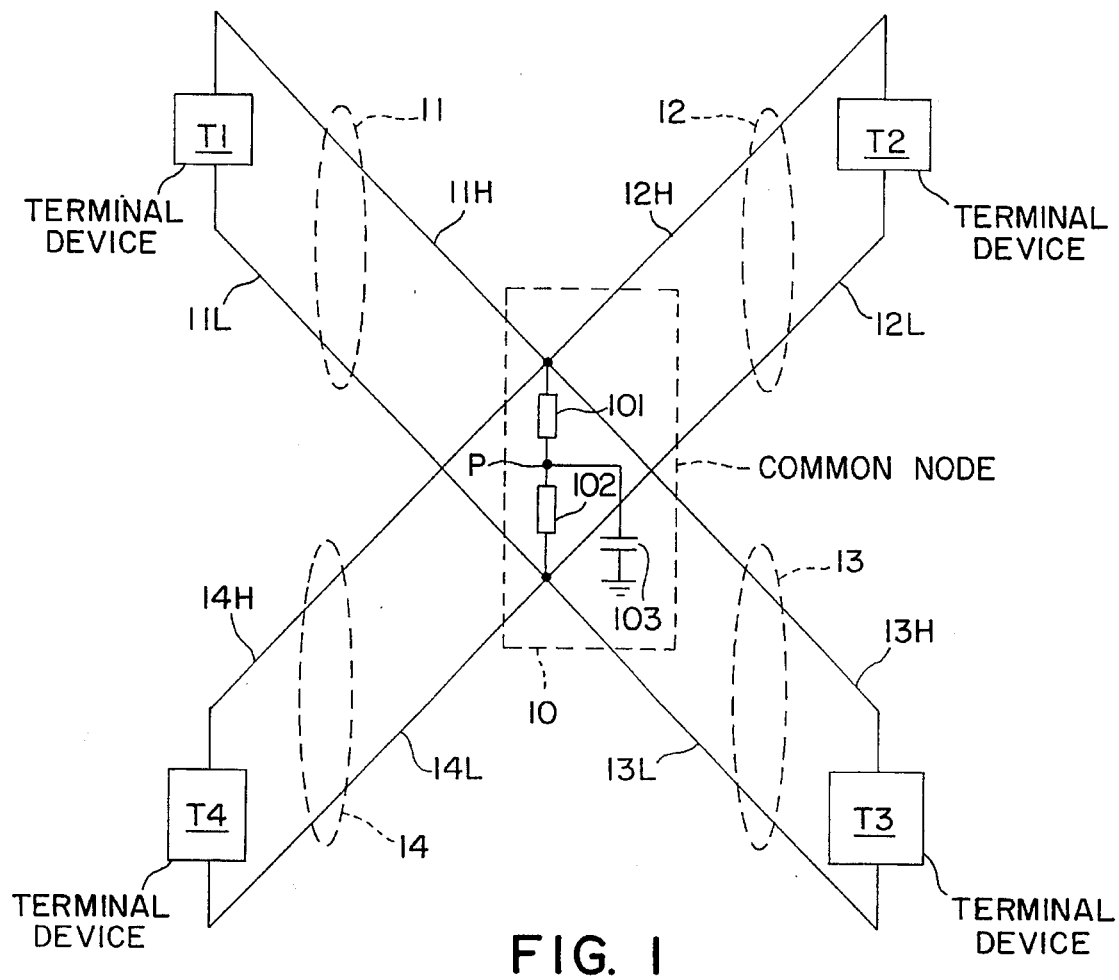
FIG. 1 illustrates a conventional balanced bus system which is configured as a star network, with transmission lines radiating from a common node.

The bus system shown in FIG. 1 connects a plurality of terminal devices T1, T2, T3, and T4 so that they can exchange digital data. The bus system is configured as a star network, with balanced or symmetrical transmission lines 11, 12, 13, and 14 radiating from a common node 10 to the terminal devices. As will be discussed in more detail below, each terminal device includes a differential transmitter for emitting serial data that is generated at that terminal device to the common node 10, and a differential receiver which receives serial data from the common node 10. The transmission lines may be twisted-pairs. Such a bus system is particularly useful in an electrically noisy environment such as an automobile, since any common-mode noise received by the transmission lines is reduced remarkably due to the use of differential transmitters and receivers. In FIG. 1, transmission line 11 has conductors 11H and 11L, transmission line 12 has conductors 12H and 12L, transmission line 13 has conductors 13H and 13L, and transmission line 14 has conductors 14H and 14L.

The node 10 contains a load impedance comprising two resistors 101 and 102 of the same size, connected in series. This load impedance connects the individual conductors H and L of the transmission lines. The connecting point P between the two resistors serves as central tap for the load impedance and provides a neutral point for data signals. A capacitor 103 diverts high-frequency common-mode interference to ground. As a compensatory measure, a low resistance resistor (not shown) may be added in series to the capacitor 103.

FIG. 2 shows details of the terminal devices in the typical construction of a CAN BUS system. Each terminal device has its own voltage regulator 50 for generating an operating voltage $V_{op}$, for example, 5V, from a supply voltage $V_s$, particularly the battery voltage of the electrical system of a motor vehicle. The voltages of the H and L conductors in the resting state of the bus system (that is, with no transmitter active) are adjusted by means of resistor networks 66, preferably to approximately one half of the operating volgage $V_{op}$. Networks 66 are formed by four nearly equal-valued resistors in a bridge arrangement, so the voltage on both the H conductors an the L conductors is about 2.5 volts. The values of these resistors lies in the range of 4kΩ, and are much higher than those of the common mode resistors, which lie in the range of 30Ω each. Each terminal device also includes a differential transmitter 60, a differential receiver 65 such as a comparator, and an operational portion (not illustrated) which receives serial data from the receiver 65 and emits serial data to the transmitter 60. Transistor pairs 61, 62 form the output stages of transmitters 60 and are connected with the conductors H and L of the transmission lines by way of load resistors 63 and 64. The output stage of a transmitter 60 is activated by complementary of a recessive bit, which represents a logical "1" according to the CAN specification, the output stage is current free and the voltage on the H an L conductors remains at the resting state. During the transmission of a dominant "0" bit, current flows through the output stage and through the load impedance and, due to a voltage drop across the load impedance, a differential voltage is detectable in the receiver 65 of the target terminal device. That is, the voltage on the H conductors of the transmission lines rises and the voltage on the L conductors of the transmission lines falls when the transistors 61 and 62 of a transmitter are turned on during transmission of a digital "0". The voltages occurring on the H and L conductors during normal operation of the bus system lie within the range of the operating voltage $V_{op}$.

If the ground connection of terminal device T1 (for example) is open, as illustrated conceptually in FIG. 2 by an imaginary switch 51 (such a switch is not actually present, of course), the entire terminal lies essentially at the potential of the supply voltage $V_s$. Furthermore, by way of the resistor network 66 of terminal device T1, the potential of the transmission lines in the resting state is raised to a value which may be essentially higher than the common-mode range of the comparators of the receivers 65, making data communication between the remaining terminal devices T2–T4 impossible.

Figure 3:
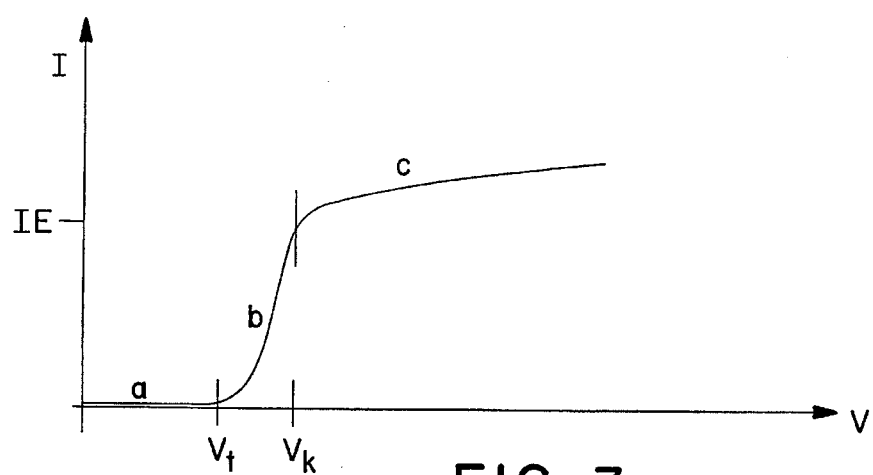
FIG. 3 is a graph showing the basic current-voltage characteristic line of the protective circuit employed in the present invention.

A protective circuit 70 in accordance with a first embodiment of the present invention is connected between the transmission lines and ground. Reference numbers I and II designate terminals of the protective circuit 70. As is shown in FIG. 3, protective circuit 70 has a voltage-current characteristic with three clearly distinct regions (a), (b), and (c).

In the first region (a), up to a threshold voltage $V_t$, no current flows from the transmission lines through the protective circuit 70 to ground. The threshold voltage $V_t$ is higher, and preferably only insignificantly higher, than the maximum voltage which occurs during normal operation of the bus system. Data traffic in the undisturbed state is thus not adversely affected by the protective circuit 70.

In region (b), above threshold voltage $V_t$ and extending to a knee voltage $V_k$, the current-voltage characteristic shows a steep increase of the current as the voltage rises, according to a low incremental resistance of the protective circuit 70, which behaves generally as a shunt regulator with constant output voltage similar to a Zener diode. If the connection to ground of terminal device T1 is opened as shown in FIG. 2, a current then flows through the resistor network 66 of this terminal device and during the resting state of the bus system this current is essentially diverted to ground by means of the protective circuit 70. Taking into consideration the construction of the terminal devices, the protective circuit 70 must be designed in such a way that the level of the transmission lines in this state still lies within the common-mode range of receivers 65. During the transmission of a "0" bit by one of the other terminal devices, the level of the L conductors continues to be lowered significantly by that terminal device's load resistor 64, whose resistance is low in relation to networks 66. The resulting difference in voltage between the H an L conductors of the transmission lines can be correctly detected in the receivers. Designing the protective circuit in special cases using different cut-off values IE may also permit the data communication system to tolerate the failure of more than one terminal device.

In the third region (c) of the protective circuit 70, the current increases only slightly as the voltage across the protective circuit increases, according to a high incremental resistance, and in this region the protective circuit behaves generally as a constant current source. The discharge current through the protective circuit 70 may therefore also be limited to values which preclude the destruction of the protective circuit in case a transmission line short circuits. The terminal devices are configured is such a way as to survive a short circuit against the supply voltage $V_s$ without damage.

The protective circuit is preferably connected to the neutral point P at the central tap of the load impedance.

The circuitry of protective circuit 70 is shown in FIG. 4.

The base of a power transistor 111 is connected to terminal I by way of the parallel circuit of a resistor 115 and a voltage-limiting member such as a light-emitting diode 116. The base is also connected to terminal II by way of the series connection of a Zener diode 114 and a resistor 113. The collector of the transistor 111 is likewise connected to terminal II of the protective circuit. The emitter of the transistor 111 is connected by way of a further resistor 112 to terminal I. In order for the protective circuit 70 to function within the communication system, terminal I of the protective circuit is connected to ground, and terminal II is connected to the transmission lines, preferably at the neutral point P as shown in FIG. 2.

So long as the voltage between terminals II and I, i.e., the voltage of the transmission lines with respect to ground, is smaller than the sum of the break-down voltage of the Zener diode 114 and the base-emitter voltage of transistor 111, resistor 115 blocks the transistor and no current flows from terminal II to terminal I. This corresponds to the region (a) of the current-voltage characteristic shown in FIG. 3. As the voltage increases between terminal II and terminal I, transistor 111 begins to conduct and the current increases quickly as voltage increases, corresponding to region (b). The incremental resistance of the protective circuit 70 in this region is low and is essentially determined by resistor 112. The protective circuit behaves as a shunt regulator with almost constant output voltage between terminal II and terminal I. Light-emitting diode 116 turns on in region (c). Since the base voltage is determined by the forward voltage of the light-emitting diode 116, the current voltage characteristic of the protective circuit 70 remains almost constant. The incremental resistance in this region is high and determined by resistor 113. The additional current, which still increases slightly due to the series connection of resistor 113 and the Zener diode 114, is shunted by way of light-emitting diode 116. The protected circuit now behaves as a constant current source.

A protective circuit 70' in accordance with a second embodiment of the present invention is shown in FIG. 5. Protective circuit 70' is advantageously monolithically integratable, in contrast to the embodiment shown in FIG. 4. The Zener diode 114 of FIG. 4 is replaced by a transistor 124 having a defined break-down voltage, and the light-emitting diode 116 of FIG. 4 is replaced by a series circuit 126 of a purality of transistors which are wired as diodes and connected in the forward direction. Otherwise the same comments with regard to function that apply to FIG. 4 are valid.

The invention allows data communication to continue even if the ground connection of a terminal device is separated, and at the same time prevents distruction in case of a short circuit with the supply voltage.

The CAN-BUS system is described in detail in ISO/TC 22/SC3 N 608, January 1991 or in CAN SPECIFICATION, Philips Components, Sept 1990.

It will be understood that the above description of the present invention is susceptible to various modifications, changes, and adaptations, and the same are intended to be comprehended within the meaning and range of equivalents of the appended claims.

What is claimed is:

1. A data communication system, comprising:

a bus system which includes a symmetrical transmission line having first and second conductors, and an ohmic load impedance connected between the first and second conductors, the load impedance having a center tap; and a protective circuit having a current-voltage characteristic, the protective circuit being connected between the center tap of the load impedance and a reference potential, the protective circuit including means for dividing the current-voltage characteristic into regions depending on the voltage across the protective circuit, the regions of the current-voltage characteristic including a first region in which no current flows through the protective circuit when the voltage across it is below a threshold voltage, the threshold voltage being higher than a normal voltage on the transmission line during data communication, a second region in which current through the protective circuit rises steeply with increasing voltage when the voltage across the protective circuit is between the threshold voltage and a knee voltage, and a third region in which current through the protective circuit is limited when the voltage across it is above the knee voltage.

2. The data communication system of claim 1, wherein the bus system further includes a capacitor connected parallel to the protective circuit.

3. The data communication system of claim 1, wherein the bus system is a CAN-BUS system which further includes a plurality of additional transmission lines having conductor pairs which are connected to the load impedance, the transmission lines radiating from the load impedance in a star configuration.

4. The data communication system of claim 1, wherein the means for dividing the current-voltage characteristic into regions comprises a constant current source which provides a substantially constant current level, and control means for controlling operation of the constant current source, the control means including a constant voltage regulator which sets a knee voltage at which the substantially constant current level begins.

5. The data communication system of claim 4, wherein the constant current source comprises a transistor having a base and an emitter, and an emitter resistor connected to the emitter, and wherein the means for dividing the current-voltage characteristic into regions further comprises a Zener diode and a resistor connected in series to the base of the transistor.

6. The date communication system of claim 1, wherein the data communication system is installed in a motor vehicle.

7. The data communication system of claim 1, wherein the load impedance comprises a first resistor that is connected to the first conductor, and a second resistor that is connected to the second conductor, the first resistor being connected to the second resistor at the center tap.

8. A data communication system, comprising:

a power source having an output terminal, the power source supplying an operating voltage at its output terminal;

a transmission line to carry data, the transmission line including first and second conductors;

a bridge network connected between the output terminal of the power source and ground, the first and second conductors being connected to the bridge network;

a load impedance connected between the first and second conductors, the load impedance having a tap; and a protective circuit, connected between the tap and ground, to permit current to flow from the tap to ground through the protective circuit if the voltage across the protective circuit exceeds a predetermined threshold voltage.

9. The data communication system of claim 8, wherein the threshold voltage is near the operating voltage.

10. The data communication system of claim 9, wherein the threshold voltage is slightly higher than the operating voltage.

11. The data communication system of claim 8, wherein the protective circuit comprises a semiconductor element having a control electrode, and means connected to the control electrode for keeping the semiconductor element non-conducting unless the voltage across the protective circuit exceeds the predetermined threshold voltage.

12. The data communication system of claim 11, wherein the semiconductor element is a power transistor having a base and the control electrode is the base of the power transistor, and wherein the means connected to the control electrode comprises a resistor connected between the base of the power transistor and ground and at least one electrical component connected between the tap and the base of the power transistor, the at least one electrical component including a semiconductor element.

13. The data communication system of claim 12, wherein the protective circuit further comprises means, connected between the base of the power transistor and ground, for imposing a limitation on current through the power transistor when the voltage across the protective circuit exceeds a knee voltage that is greater than the threshold voltage.

14. The data communication system of claim 13, wherein the means for imposing a limitation comprises a semiconductor element.

15. The data communication system of claim 11, wherein the protective circuit further comprises means connected to the control electrode for imposing a limitation on current through the semiconductor element if the voltage across the protection circuit exceeds a knee voltage that is greater than the threshold voltage.

16. The data communication system of claim 8, further comprising another transmission line to carry data, the another transmission line including third and fourth conductors which are connected to the load impedance, and a further transmission line to carry data, the further transmission line including fifth and sixth conductors which are connected to the load impedance.

17. The data communication system of claim 8, wherein the load impedance comprises a first resistor that is connected to the first conductor, and a second resistor that is connected to the second conductor, the first resistor being connected to the second resistor at the tap.

18. The data communication system of claim 8, wherein the bridge network comprises a resistor bridge.

* * * * *